July 17, 1956   H. L. DAVIS   2,754,892
SEAT BACK SPRING

Filed Jan. 18, 1954   3 Sheets-Sheet 1

INVENTOR.
HARLAN L. DAVIS
BY
Barnes, Kisselle, Laughlin & Raisch
ATTORNEYS.

July 17, 1956  H. L. DAVIS  2,754,892
SEAT BACK SPRING

Filed Jan. 18, 1954  3 Sheets-Sheet 2

INVENTOR.
HARLAN L. DAVIS
BY
Barnes, Kisselle, Laughlin & Raisch
ATTORNEYS.

July 17, 1956

H. L. DAVIS 2,754,892

SEAT BACK SPRING

Filed Jan. 18, 1954

INVENTOR.
HARLAN L. DAVIS
BY
Barnes, Kisselle, Laughlin & Raisch
ATTORNEYS.

2,754,892
SEAT BACK SPRING

Harlan L. Davis, Adrian, Mich., assignor to Stubnitz-Greene Spring Corporation, Adrian, Mich., a corporation of Michigan Application January 18, 1954, Serial No. 404,565

4 Claims. (Cl. 155—179)

This invention relates to seat back springs for the rear seat. Seat back springs of this type have to be provided with the flat narrow hammock section to accommodate the wheel housing. Heretofore one form of spring of this type has utilized a wing over the wheel housing consisting of a stretch of burlap combined with a zigzag rubber cord. The rubber cord tension strip is clipped to the adjoining row of load supporting springs and also clipped to the stretch of burlap. This provides an adequate wing for support over the wheel housing, but it is more expensive than my improvement.

It is the object of the present invention to provide a substitute for this hammock section which is cheaper and more yieldable so as to improve the comfort of the rider. To this end I propose to provide an all-metal supporting surface consisting of rings combined with coil spring tie members. Referring to the drawings.

Figure 1:
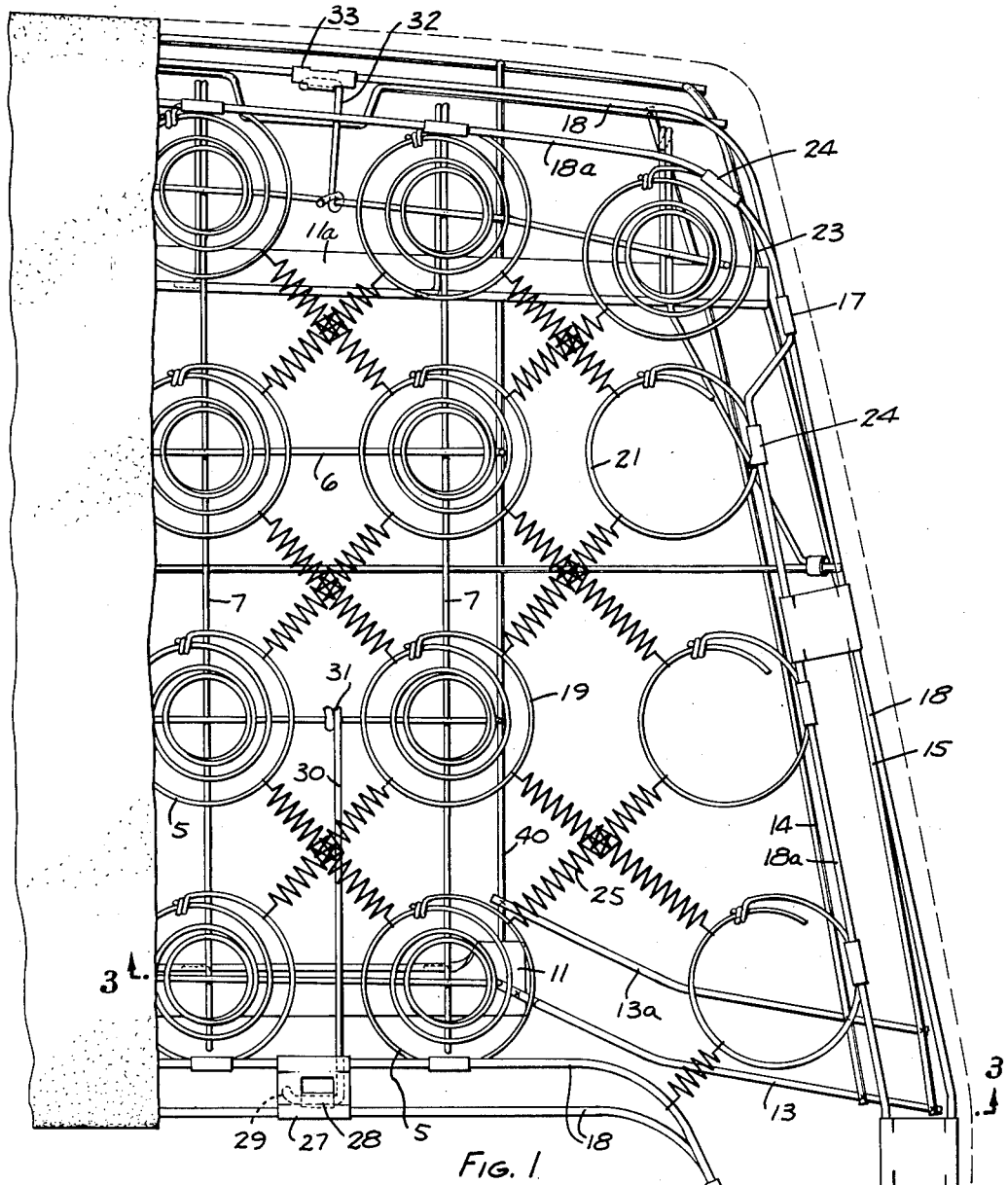
Fig. 1 is a fragmentary front elevation of the seat back spring.
Figure 2:
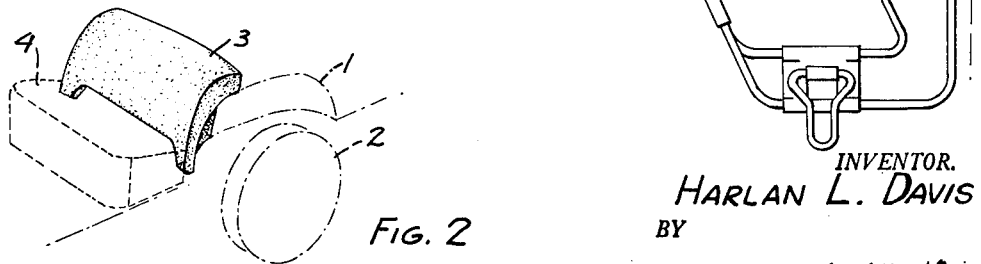
Fig. 2 is a miniature perspective of a rear seat and back showing its relation with the wheel housing.

Referring to Fig. 2, 1 designates the wheel housing, 2 the wheel, 3 the seat back cushion and 4 the seat bottom cushion. These are shown in miniature simply to give an idea for what this seat back cushion spring is used.

Figure 3:
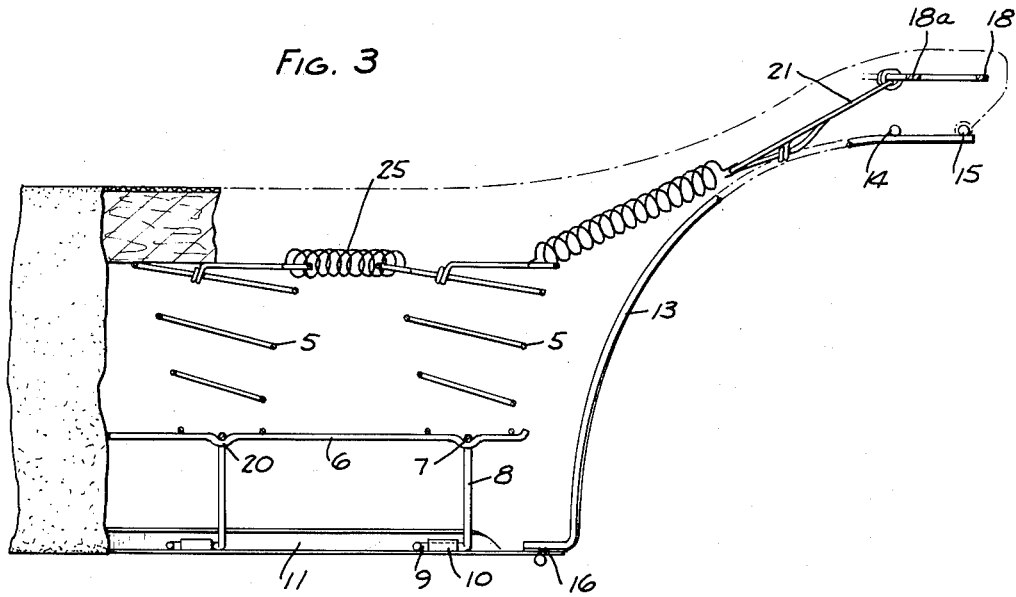
Fig. 3 is a fragmentary section of the spring along line 3—3 of Fig. 1.
Figure 4:
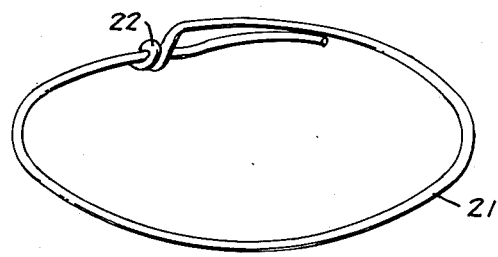
Fig. 4 is a perspective of one of the rings over the wheel housing area.
Figure 5:
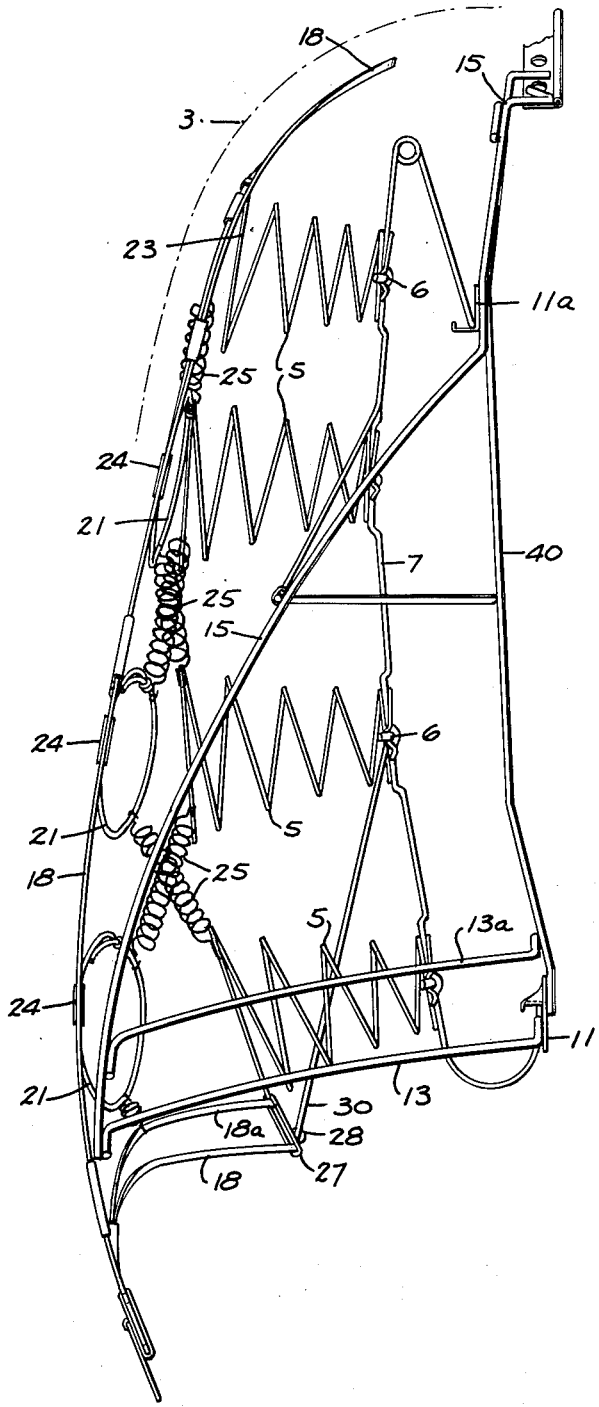
Fig. 5 is an end elevation of the seat back spring.

The main body of the seat back cushion is formed by a plurality of conical coiled springs 5. These are the load-supporting springs and they are supported on a mat formed by the longitudinal stringers 6 and the cross stringers 7. These cross stringers have legs 8 (Fig. 3) at the front and rear which are provided with bent-over feet 9 which are supported in the knuckles 10. These knuckles are formed by stuck-up tongues from the sheet metal under frame members 11. There is a top back frame member 11a and a bottom under frame member 11. The bottom frame member 11 supports the two heavy wire side outer frame members 14 and 15, over the wheel housing area, by the stiff wire hanger arches 13 and 13a. The lower end of the wire arch is spot welded to the frame member 11 at 16. The lower end of 13a is spot welded to wire strut 40. These side wire frame members 14 and 15 are arched downwardly and spot welded under frame member 11a, thus forming wheel house clearance. Top frame members 18 and 18a extend over, and rest on, the arched clearance area formed by wires 13, 14 and 15 at each end.

The load-supporting conical springs are screwed into the wire mat at the intersections 20. This assembly of short coiled springs together with the mat formed in part by the spring stringers is a double-deck spring structure which is described and claimed in the recent Stubnitz patent, 2,642,929, June 23, 1953. These coiled load-supporting springs are not present in the section of the spring cushion that lies over the wheel housing. This is the wing or flat narrow section of the seat back spring which has heretofore been usually formed by a stretch of burlap which has been clipped at its outside edge to the top frame member 18a and the inside edge of this stretch of burlap has been hog-ringed to a rubber tension cord and this cord was then clipped to the top of the adjacent load-supporting spring. Inasmuch as the web of burlap is at its inner edge spaced an inch or an inch and a half from the adjoining tops of the coil springs, this has caused the rubber cord to zigzag from each coil spring top to the adjacent edge of the burlap web and the rubber cord forms part of a supporting area of the wing over the wheel housing. This has formed a hammock section with the rubber cord unyieldable.

In place of this, I propose to use a row of coiled spring tops 21. These rings are simply the top coil of a coiled spring. Conceivably, instead of a knot 22, the ring might be a ring formed by a piece of wire bent into a circle with the ends butt welded or welded in some other fashion. This row of rings at the top of the cushion is supplemented by a full coil spring 23 because the wheel house clearance does not have to extend all the way up. This spring together with the spring tops or rings 21 are clipped to the border wire adjacent by clips 24. This row of rings will be directly over the wheel housing when the spring is installed in the body. The rings are progressively further spaced from the adjoining row of coil load-supporting springs as one goes from the top of the seat back spring to the bottom. The rings are resiliently connected with the adjoining tops of the load-supporting springs by crossed and coiled spring ties 25 which have hook ends that are looped over the rings. These are the same coiled spring ties that are used to connect the inside rows of coil springs at their tops.

The top frame members 18 and 18a at lower edge of the assembly are connected together by clips 27 which have a tongue 28 stuck out and rolled over to form a knuckle in which the end 29 of a diagonal wire brace 30 is anchored. This brace has its inner end hooked at 31 over one of the longitudinal wires 6 of the mat. Similarly, a brace 32 is clipped by clip 33 to the wire frame member 18 at upper edge of the seat back spring assembly.

What I claim is:

1. A rear seat back spring with a wheel housing section having in combination top, bottom and side frame members, a set for the back of the spring assembly and a set for the front of the spring assembly, a spring mat comprising, longitudinal stringers and cross stringers, the cross stringers anchored at the upper and lower ends to the bottom frame and the longitudinal and cross stringers intersecting, coiled load-supporting springs anchored to the mat at the stringer intersections, the load-supporting springs having the end rows susbtantially spaced from the side frame members to form a flat narrow section over the wheel housing, spring wire rings forming part of said section, said rings clipped to the side members of the top frame and substantially spaced from each other and from the tops of the adjacent row of load-supporting springs, and resilient tie members connecting the rings with the tops of the end rows of load-supporting springs and completing the wheel housing section.

2. The combination claimed in claim 1 in which the tie members connecting the adjacent rings and spring tops are crossed.

3. The combination claimed in claim 1 in which the tie members are coiled tractile springs.

4. The combination claimed in claim 1 in which the rings are tops of truncated coil springs.

References Cited in the file of this patent

UNITED STATES PATENTS

| | | |
|---|---|---|
| 1,164,534 | Lewis | Dec. 14, 1915 |
| 1,342,522 | Young | June 8, 1920 |
| 1,953,276 | Suekoff | Apr. 3, 1934 |
| 2,101,054 | Eaton | Dec. 7, 1937 |
| 2,364,948 | Clark | Dec. 12, 1944 |
| 2,649,895 | Stubnitz | Aug. 25, 1953 |
| 2,671,498 | Stubnitz | Mar. 9, 1954 |
| 2,684,844 | Flint et al. | July 27, 1954 |